(12) United States Patent
Taylor

(10) Patent No.: US 6,401,241 B1
(45) Date of Patent: *Jun. 4, 2002

(54) CLASS ARCHIVE SOFTWARE PACKAGES

(75) Inventor: Julian Steven Taylor, Colorado Springs, CO (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/539,995

(22) Filed: Oct. 6, 1995

(51) Int. Cl.[7] .............................................. G06F 9/445
(52) U.S. Cl. ..................................................... 717/174
(58) Field of Search ................................ 395/680, 681, 395/682, 683; 769/300, 301, 302; 705/27; 717/11, 174, 175, 176, 177, 178

(56) References Cited

U.S. PATENT DOCUMENTS

| | | | | |
|---|---|---|---|---|
| 5,150,473 A | * | 9/1992 | Zulch | 711/162 |
| 5,155,847 A | * | 10/1992 | Kirouac et al. | 709/221 |
| 5,289,540 A | * | 2/1994 | Jones | 113/165 |
| 5,315,655 A | * | 5/1994 | Chaplin | 713/167 |
| 5,398,283 A | * | 3/1995 | Virga | 380/243 |
| 5,438,671 A | * | 8/1995 | Miles | 709/247 |
| 5,555,416 A | * | 9/1996 | Owens et al. | 717/178 |
| 5,557,674 A | * | 9/1996 | Yeow | 713/193 |
| 5,630,092 A | * | 5/1997 | Carreiro et al. | 711/111 |
| 5,742,829 A | * | 4/1998 | Davis et al. | 717/178 |
| 5,761,649 A | * | 6/1998 | Hill | 705/27 |
| 5,842,024 A | * | 11/1998 | Choye et al. | 717/178 |

OTHER PUBLICATIONS

Shaw, Dennis F. "Computer Virology and Aids" ICCST, 1989, p. 11–14.*
Ford, Ric. "Know–it–all installers don't really know it all" MacWeek, Feb. 22, 1993, p. 1–2.*
Stoll, Clifford, "Stalking the Wily Hacker". Communications of the ACM, May 1988, p. 484–497.*
Coulouris, George et al. "Distributed systems concepts and Design" 1994, Chap. 16, pp. 477–492.*
The Design Of The UNIX Operating System, Maurice J. Bach, Prentice Hall, Jan. 1, 1990.*

* cited by examiner

*Primary Examiner*—St. John Courtenay, III
*Assistant Examiner*—Lewis A. Bullock, Jr.
(74) *Attorney, Agent, or Firm*—William J. Kubida; Stuart T. Langley; Hogan & Hartson LLP

(57) ABSTRACT

SYSTEM V utilities enable software developers to provide delivery of complex packages onto a UNIX operating system. An enhancement to the UNIX System V ABI format called class archive format enables sets of files to be combined into archives, these files being compressed or encrypted. The compressed/encrypted ABI package install with behavior defined in System V ABI. The class archive format allows a manufacturer to combine files from the ABI format reloc directory and root directory, into an archive directory. Class action format adds a directory called archive to the ABI format. Any class of files that are intended for archive is combined into a single file, and each file is then placed into the archive directory as class1, class2, etc. All files that are archived in this manner are removed from the standard ABI reloc directory and root directory, and an install class action script is placed into the scripts portion of the standard ABI install directory. Three interfaces are provided in the form of three keywords. These three keywords are (1) PKG_SRC_NOVERIFY, (2) PKG_DST_QKVERIFY, and (3) PKG_CAS_PASSRELATIVE. These keywords are used to designate classes of the archive directory that require special treatment. The format of each keyword statement is "keyword=class1 [class2 class 3 etc.]". Each class action script contains Bourne shell commands that are executed by pkgadd to install the files from the archive directory.

24 Claims, 6 Drawing Sheets

CLASS ARCHIVE SOFTWARE PACKAGES

BACKGROUND OF THE INVENTION

1. Field of the Invention

This invention relates generally to a method that provides UNIX operating system packages (i.e., software that is written for use with the UNIX operating system, and more specifically UNIX System V) having special formats that are understandable to various UNIX packaging utilities. While the invention will be described with reference to the UNIX System V operating system, in its broader aspects the invention is not to be limited thereto.

2. Description of the Related Art

UNIX System V software products are prepared in accordance with formats that are defined by the Application Binary Interface (ABI) that is a supplement to the System V Interface Definition (SVID). Software products in this ABI format are called packages. While the ABI format is versatile, lends itself to well-organized administration, lends itself to the installation of very large packages, and lends itself to the installation of a large number of packages, operation upon packages in the ABI format can be quite slow.

As is well known to those of skill in the art to which this invention pertains, it is difficult to deliver System V packages using special formats that include, without limitation thereto, archived or compressed data, encrypted data, and other packages that are carried within a primary package.

A prior practice has been to use proprietary utilities in order to reassemble a base ABI package into what can be called a compressed package. The result was to provide faster installation speed and smaller packages. While the advantages of using compressed packages for initial installation are clear to those skilled in this art, the format used in these software releases was rather complicated, and the utility which installed the software had to contain special software to deal with the specialized format.

The need remains in the art for an enhancement to the UNIX System, V format that will easily enable special functions, such as compression and encryption.

SUMMARY OF THE INVENTION

The present invention provides a set of SYSTEM V utilities that enable software developers to provide easy delivery of complex packages onto a UNIX operating system. More specifically, this invention provides an enhancement to the UNIX System V ABI format, referred to herein as class archive format or package. A class archive package in accordance with the invention is a package in which certain sets of files are combined into single files or archives, wherein these files are optionally compressed or encrypted.

The present invention provides a base ABI package that has been reassembled into a compressed ABI package, thus providing the desired results of faster installation speed and smaller packages. This is done in a manner to ensure that the compressed ABI package will install with the behavior that is defined in the System V ABI. In addition, class archive packages in accordance with this invention improve reliability during installation of packages, and during installation of patches onto potentially active file systems.

The method of the present invention allows a package producer/manufacturer to compress, and then deliver to the market a compressed package, as long as certain requirements are followed. A variety of known compression/decompression algorithms can be used in accordance with the invention.

The following description of the invention will describe the structure of a class archive package, as well as methods for constructing such a class archive package.

The class archive format of the present invention preferably allows a package manufacturer to combine files from the ABI format reloc directory and root directory into an archive directory. These files are compressed, encrypted or otherwise processed in any desired way, the end result being increased installation speed, reduced package size, and/or increased package security.

The class action format of the present invention adds a directory called archive to the ABI format. Any class of files that are intended for archive is combined into a single file, and each such single file is then placed into the archive directory as class1, class2, etc. In a preferred embodiment, all files that are archived in this manner are then removed from the standard ABI reloc directory and the standard ABI root directory, and an install class action script is placed into the scripts portion of the standard ABI install directory.

In order to support the class action format of the present invention, three interfaces are provided in the form of three keywords that have special meaning. These three keywords are (1) PKG_SRC_NOVERIFY, (2) PKG_DST_QKVERIFY, and (3) PKG_CAS_PASSRELATIVE. These three keywords are used to designate the classes of the archive directory that require special treatment. The format of each keyword statement is "keyword=class1 [class2 class 3 etc.]".

Of these three keywords, only the keyword PKG_SRC_NOVERIFY is an absolute requirement for implementing a class archive package in accordance with the preferred embodiment of the present invention. Use of the other two keywords is desirable in order to increase installation speed and/or to conserve code.

In the preferred embodiment, for each archived class within the archive directory a class action script is required in the install directory. Each such class action script preferably contains Bourne shell commands, and each such class action script is typically executed by pkgadd to install the files from the archive directory.

A specific utility of this invention is to provide in a computer system an extension to the computer system's operating system wherein an archive directory contains classes of a software package having special-features, wherein an install directory contains install-class-action scripts whose execution enables installation of the special-feature classes from the archive directory in a manner that does not require validation of the special-feature classes, and wherein files in the special-feature classes are organized into a list that enables the files to be installed from the archive directory by operation of the install-class-action scripts These and other advantages and features of the present invention will be apparent to those of skill in the art upon reference to the following detailed description of the invention, which detailed description makes reference to the drawing.

DESCRIPTION OF THE PREFERRED EMBODIMENT

Incorporated herein by reference are the following UNIX System V documents; (1) System V Definition, AT&T, a five volume publication by Prentice Hall, and (2) System V Application Binary Interface, AT&T, a publication by Prentice Hall.

Figure 1:
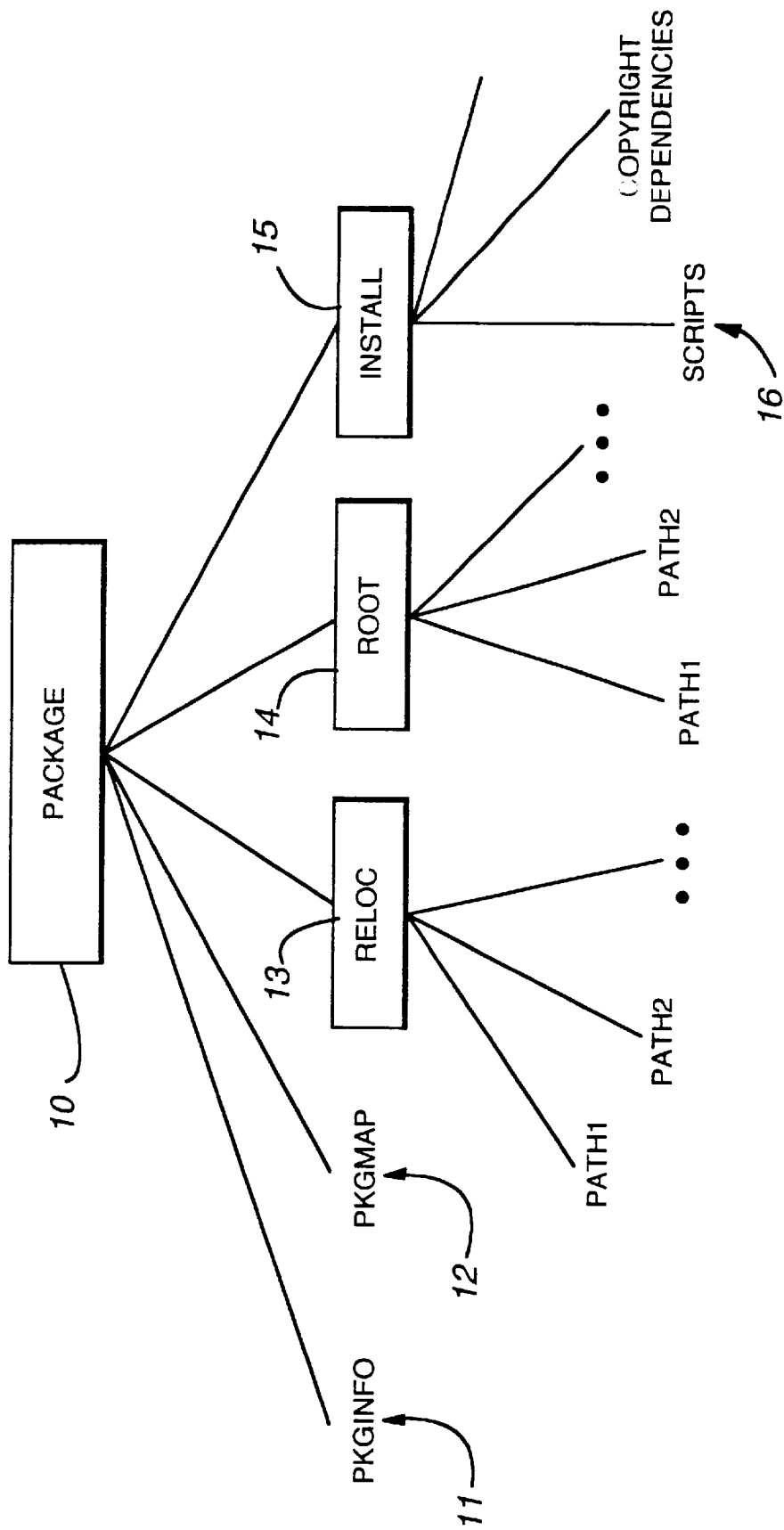
FIG. 1 is a showing of the well-known UNIX SYSTEM V ABI format.

It is desirable to initially describe the above-mentioned standard ABI format with reference to FIG. 1. Number 10 represents a package's directory that contains package files. The name of directory 10 must be the same as the package name; for example, a package named SUNWcsu is comprised of a directory 10 named SUNWcsu and its contents. Within directory 10 are pkginfo file 11 and pkgmap file 12, as well as whatever other files are necessary to make up the package. Pgkinfo file 11 describes the package as a whole, including special environment variables and installation directives. Pgkmap file 12 resembles a packing list in that it describes each object that is to be installed, examples of objects being file, directory, pipe, etc.

Reloc directory 13 of FIG. 1 is a directory that contains the files and directories to be installed relative to the base directory defined in pkginfo 11; that is, the relocatable objects. Root directory 14 is a directory that contains files and directories to be installed relative to the root directory of the UNIX file system; that is, the root objects. Install directory 15 is a directory the contains scripts (UNIX shell programs) 16 and other auxiliary files.

The well known System V ABI of FIG. 1 allows any file within a package 10 to be assigned to a class. All files that are within a specified class may then be installed to a disk using a method that is defined by a class action script 16.

Figure 2:
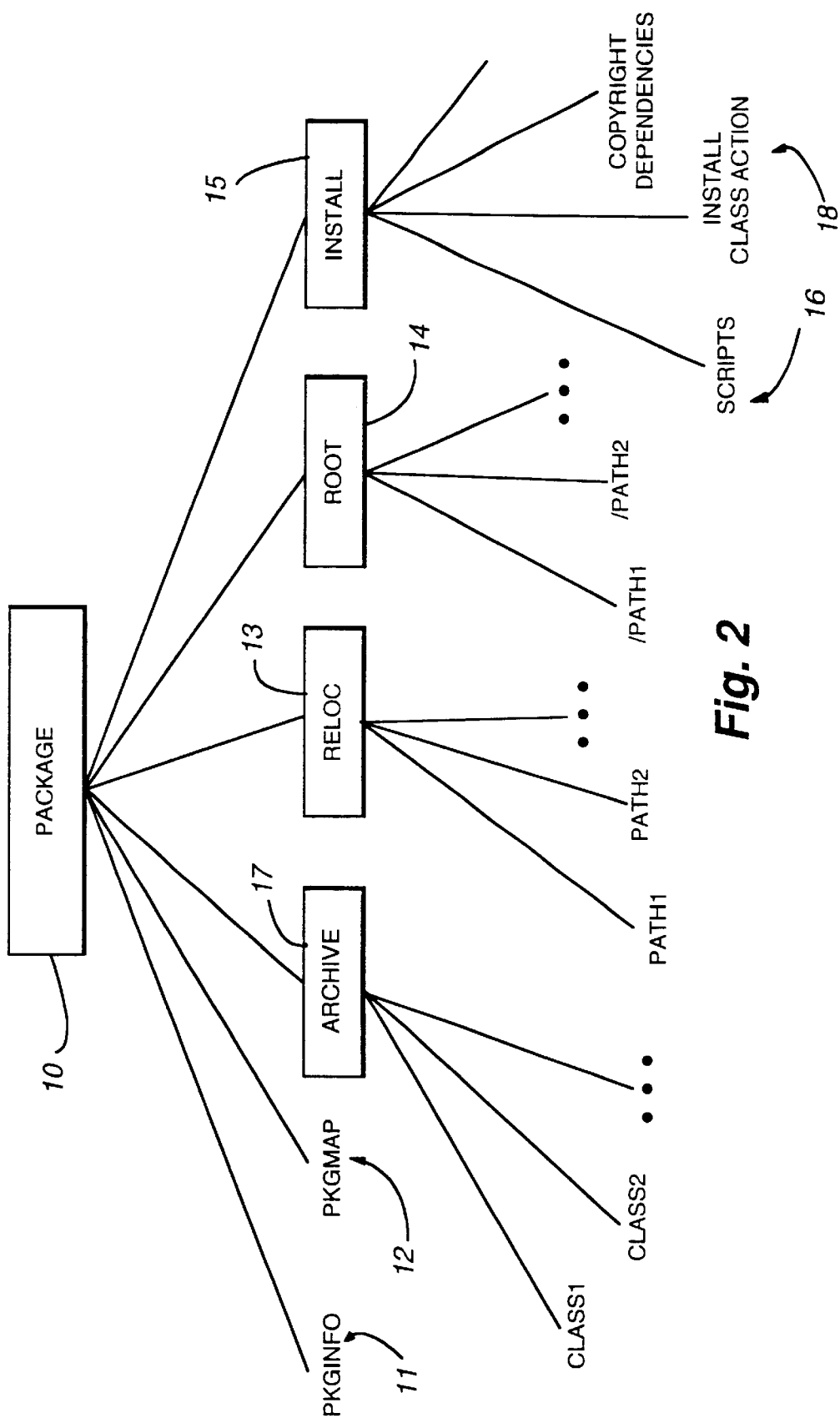
FIG. 2 is a showing of a UNIX SYSTEM V ABI format in accordance with an embodiment of the present invention, this ABI format providing an archive directory, and one or more install class action scripts in accordance with this embodiment.

With reference to FIG. 2, the class archive format of the present embodiment allows a package manufacturer to combine files from ABI format reloc directory 13 and root directory 14 into archives 17 that are compressed, encrypted or otherwise processed in any desired way, the end result typically being increased installation speed, reduced package size, and/or increased package security.

With reference to the class action format of the present embodiment as shown in FIG. 2, the present embodiment adds a directory 17, called archive, to the ABI format that is shown in FIG. 1. Any class of files that are intended for archive is combined into a single file, and each such single file is then placed into archive directory 17 as class1, class2 - - - . All files that are archived in this manner are preferably then removed from reloc directory 13 and root directory 14, and an install class action script 18 is placed into scripts 16 of install directory 15 for each of these files.

As used herein, the term archive is intended to mean a copy of one or more files, or a copy of a database that is saved for future reference, or for recovery purposes in case the original data is damaged or lost.

In order to support the class action format of FIG. 2, three interfaces are provided in the form of three keywords that have special meaning within pkginfo file 11. These three keywords are (1) PKG_SRC_NOVERIFY, (2) PKG_DST_QKVERIFY, and (3) PKG_CAS_PASSRELATIVE. These three keywords are used to designate the classes of archive directory 17 that require special treatment. The format of each keyword statement is "keyword=class1 [class2 class 3 - - - ]". These three keywords are defined as follows:

PKG_SRC_NOVERIFY (package-source-no-verify) tells the System V pkgadd utility not to verify the existence and properties of the files in the package's reloc directory 13 and root directory 14, if these files belong to the class that is named in the keyword. In a preferred embodiment, this keyword is required for all archived classes, since these files are no longer in reloc directory 13 or root directory 14; that is, these archived files are now a private format file that is in archive directory 17.

PKG_DST_QKVERIFY (package-destination-quick-verify) defines files in the classes named in the keyword that are verified after installation, using a quick algorithm with little or no text output. This quick-verify keyword first sets each of the file's attributes correctly, and then checks to see if the operation was successful. A test of file size and modification time is then conducted against the information that is contained in pgkmap 12. No checksum verification is performed and as a result, there may be poorer error recovery than is provided by the standard System V verification mechanism. In the event of a power outage or a disk failure during package installation, the contents of the file may be inconsistent with the installed files. However, such inconsistency can be resolved by operation of the System V pgkrm utility.

PKG_CAS_PASSRELATIVE (package-class-action-script-pass-relative) - - - Normally, above-described install class action script 18 that is within scripts 16 receives from the System V utility stdin a list of source/destination pairs telling class action script 18 which files to install. For example, class action script 18 may look as follows:

for read src dst
do
  /usr/bin/cp $src $ dst
done

The classes that are named in the keyword PKG_CAS_PASSRELATIVE do not get the above-described source/destination pairs. Instead, these classes receive a single list, the first entry of which is the location of the source package, and the remaining entries of which are the destination path. This list simplifies the extraction of classes from archive directory 17. From the location of the source package, the archive classes can be found in archive directory 17, whereupon the destination paths are passed to the function that is responsible for extracting the contents of the archived classes. Each destination path is either absolute or it is relative to base directory 10, depending upon whether the path was originally located in reloc directory 13 or root directory 14. When this keyword option is chosen, it may be difficult to combine both relative and absolute paths into a single class of archive 17. An example of an install class action script 18 for an archived class (for example, class1 of FIG. 2) using this keyword is as follow:

```
        #Class action script to extract the cpio
archive of
        #class1. The archive is in archive directory
17, and
        #it is named class1.
        BD=$ {BASEDIR:-/}
        FILELIST = /tmp/extractlist$$
        read path
        if [ $ {path: -NULL } !=NULL ]
        then
              PKGSRC=$path #this is where the source
pkg is
        else
              exit 0 #empty pipe, we're done
        fi
        #now we know where the archive is
        Reloc_Arch=$PKGSRC/archive/class1
        #create extraction list
        while read path
        do
              echo $path >> FILELIST
        done
        #Now extract the files from archive directory
        cd $BD
        #Go to the correct base directory
        cpio -idukm -I $Reloc_Arch -E $FILELIST
        rm $FILELIST
        exit 0
```

Of these three keywords, only the keyword PKG_SRC_NOVERIFY is an absolute requirement for implementing a class archive package in accordance with the present embodiment. However, use of the other two keywords is desirable in order to increase installation speed and/or to conserve code.

In a preferred embodiment, for each archived class of archive directory 17, a class action script 18 is required in scripts 16 of install directory 15. Each such class action script 18 is a file that preferably contains Bourne shell commands, and each such class action script 18 is executed by pkgadd to install the files from archive directory 17.

If a class action script 18 is found in the install directory 15 of the package 10 being installed on a target system, pkgadd operates to turn over all responsibility for installation of that class to that class action script 18. The class action script 18 is then run with root permissions, and the class action script 18 can then install its files onto the target system.

Again with reference to FIG. 2, a multi-step example of the utility of the present embodiment will now be provided.

Step (1)—The manufacturer of software package 10 decides what classes are to be archived in archive directory 17, and what special method of archive is to be used; for example, compression and/or encryption.

Step (2)—For each such special class, a class action script 18 is written that will operate, when executed by pkgadd, to extract that class from archive directory 17.

Step (3)—The necessary keywords are added to pkginfo file 11. For example, if class1 and class2 are to be archived and the installation of class1 is adequately confirmed in class action script 18, the entries to pkginfo 11 would be as follows:
PKG_SRC_NOVERIFY=class1 class2
PKG_DST_QKVERIFY=class1

Step (4)—All class action scripts 18 are then included in the prototype file to the System V pkgmk Utility.

Step (5)—Package 10 is created using this pkgmk utility. This results in package 10 being constructed with class1 and class2 files in reloc directory, 13 or root directory 14.

Step (6)—Archive directory 17 is then created in package 10.

Step (7)—Class1 and class2 are archived in archive directory 17.

Step (8)—Class1 and class2 are then deleted from relic directory 13 and/or root directory 14.

As will be appreciated by those of skill in the art, converting an ABI package to a class archive package of the present invention is easily reduced to a procedure such that all, or some of the above-described steps 6, 7 and 8 can be automated.

Without limitation thereto, exemplary uses of the present invention include use by a software developer to ship a package containing encrypted software data, and/or use by a software developer to data-compress a large package so as to be able to fit the package onto a floppy disk for delivery to the market. In accordance with the invention, these end results are achieved by adding one or more install class action scripts 18 to the FIG. 2 scripts portion 16 of ABI install directory 15. Install class action scripts 18 of the present embodiment comprise an extension of the SYSTEM V ABI.

In the present embodiment, install class action scripts 18 are not required in the ABI format. However, if an install class action script 18 is present, it will be executed by the SYSTEM V pkgadd utility as is appropriate.

Figure 3:
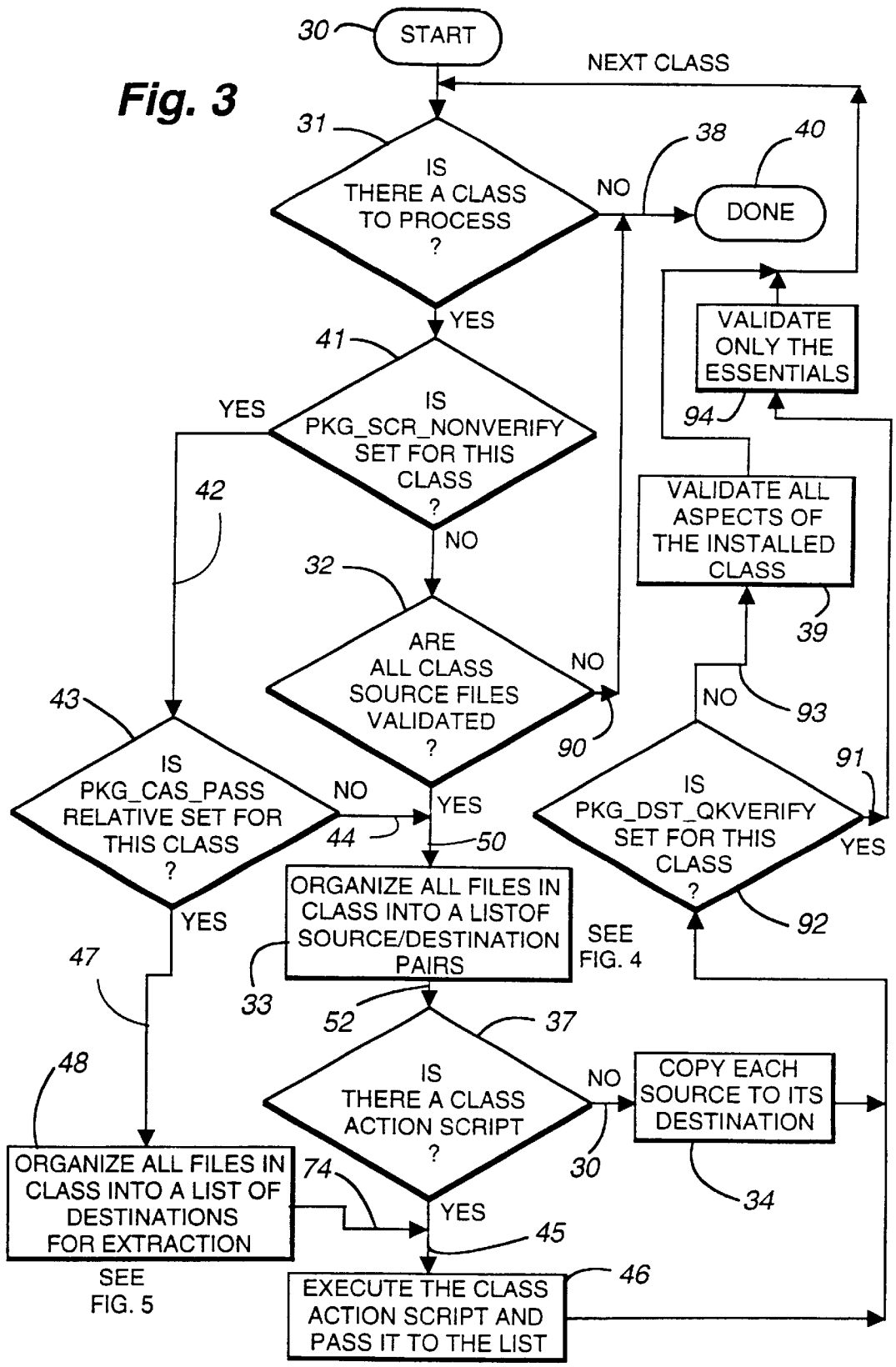
FIG. 3 is, a flowchart illustrating the logical operations or steps of an embodiment of the present invention.

FIG. 3 is a flowchart showing operation of the present invention. As will be apparent, the invention uses the well-known UNIX System V class mechanism or method to install all items provided destinations in a destination list from a file, or files, that are of arbitrary construction.

As is well known, the SYSTEM V utility pkgadd operates to install, and verify or validate all classes and source files that are within a package. The standard System V validate function 39 of FIG. 3 uses information that is contained in FIG. 2's pkgmap 12.

This prior type operation of pkgadd is provided by the operation of functions 31,32,33,34,39 shown in FIG. 3. That is, (1) as long as the package being installed to the UNIX SYSTEM V computer includes another class to process, as is indicated by the yes output of decision function 31, (2) as long as all class source files are validated, as is indicated by the yes output 50 of decision function 32, (3) all files in the class are organized into a list of source and destination pairs by function 33 (shown in detail in FIG. 4), (4) each source is copied to its destination by operation of function 34, and (5) function 39 operates to validate all aspects of the installed class.

After the installed class is fully validated by function 39, the FIG. 3 process repeats relative to the next class.

When decision function 31 determines that no class remains to be processed, its no output 38 ends software installation process as indicated at 40.

As is well known, if validation decision function 32 is not satisfied (i.e., if all source files of the class are not verified), the no output 90 of decision function 32 ends package installation, as is indicted at 40.

The above-described prior operation of the UNIX System V pkgadd utility required that all files be plain-text (i.e., unencrypted) and uncompressed, primarily due to the need to validate all source files by function 32. The present invention allows files to be encrypted and/or compressed, as will be apparent.

Whenever decision function 41 determines that the keyword PKG_SRC_NOVERIFY has been set for the class, an indication is provided that the class being processed is a special class, this being the required keyword that is used to indicate a special class. In this case, the yes output 42 of function 41 enables decision function 43 to; determine if the keyword PKG_CAS_PASSRELATIVE is also set for the class.

The keyword PKG_SRC_NOVERIFY that is looked for by decision function 41 allows a software manufacturer to label a class1 as a special class that is not in the standard UNIX System V format. As stated previously, of the three keywords utilized by the present invention, only the keyword PKG_SRC_NOVERIFY that is checked by decision function 41 is an absolute requirement for implementing a class archive package in accordance with the present embodiment, use of the other two keywords is desirable in order to increase installation speed and/or to conserve code.

First it will be assumed that the no output 44 of decision function 43 indicates that the PKG_CAS_PASSRELATIVE is not set for the class. In this case, the FIG. 4 file organization process 33 is performed. Since a class action script 18 is present for this class, output 45 of decision function 37 now enables function 46. That is, the class action script 18 is executed. The class action script 18 is passed the list that is produced by function 33. This list comprises an input to the class action script and in this case, the list is constructed by operation of FIG. 4.

Next, it will be assumed that the yes output 47 of decision function 43 indicates that the keyword PKG_CAS_PASSRELATIVE is set for this class. In this case, the FIG. 5 file organization process 48 is performed, whereupon above-mentioned function 46 is enabled.

As before, when decision function 31 determines that no class remains to be processed, the no output 38 of decision function 31 enables ending of the package installation process, as indicated at 40.

At the conclusion of function 46, decision function 92 operates to determine the level of validation that is desired for this class, now an installed class. If the keyword PKG_DST_QKVERIFY is set for this class, yes output 91 from decision function 92 enables function 94 to validate only the essential parts of this installed class. If this keyword is not set, then no output 93 of decision function 92 enables the standard System V validation function 39 which operates to validate all aspects of each installed file, some aspects of which may have already been validated by the class action script 18 during operation of function 46.

Figure 4:
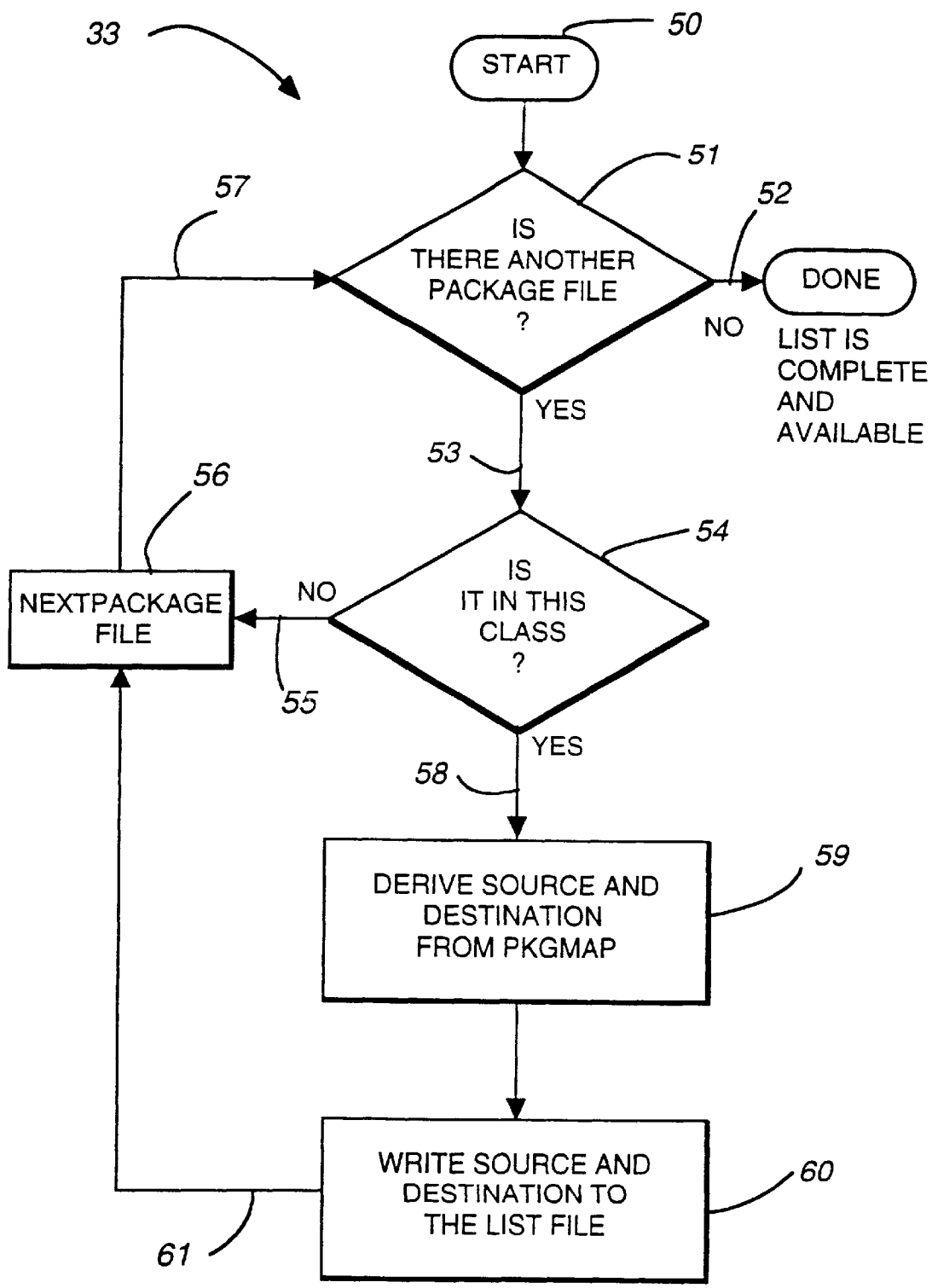
FIG. 4 is a flowchart showing the steps of a first embodiment of the "organize-all-files-in-a-class" operation 33 in FIG. 3; i.e., the operation of the present invention when the PKG_CAS_CLASSRELATIVE keyword is not present or set in the install class action script of the present invention.

In Summary:

(1) when a class action script 18 of the present invention is not present for a class that is being installed, function 32 checks to determine if all class source files have been validated, the FIG. 4 process 33 operates to organize the files of the class, each source file is copied to its destination by operation of function 34, and function 39 operates to validate all aspects of the installed class, (2) when a class action script 18 of the present invention is present for a class that is being installed, wherein the keyword PKG_SRC_NOVERIFY is set, but the keywords PKG_CAS_PASSRELATIVE and PKG_DST_QKVERIFY are not set, validation checking function 32 is skipped, function 33 operates to organize the files of the class, function 46 operates to execute the class action script that is associated with the class being installed, and function 39 operates to validate all aspects of the installed class, (3) when a class action script 18 of the present invention is present for a class that is being installed, wherein the keywords PKG_SRC_NOVERIFY and PKG_CAS_PASSRELATIVE are set, but the keyword PKG_DST_QKVERIFY is not set, validation checking function 32 is skipped, function 48 operates to organize the files of the class, function 46 operates to execute the class action script that is associated with the class being installed, and function 39 operates to validate all aspects of the installed class, and (4) when a class action script 18 of the present invention is present for a class that is being installed, wherein the keywords PKG_SRC_NOVERIFY and PKG_DST_QKVERIFY are set but the keyword PKG_CAS_PASSRELATIVE is not set, validation checking function 32 is skipped, function 33 operates to organize the files of the class, function 46 operates to execute the class action script that is associated with the class being installed, and function 39 operates to validate all aspects of the installed class, and, (5) when a class action script 18 of the present invention is present for a class that is being installed, wherein all three of the keywords PKG_SRC_NOVERIFY, PKG_CAS_PASSRELATIVE and PKG_DST_QKVERIFY are set, validation checking function 32 is skipped, function 48 operates to organize the files of the class, function 46 operates to execute the class action script that is associated with the class being installed, and function 94 operates to validate only the essential aspects of the installed class.

Utility of the present invention is apparent to those skilled in the art when special installation procedures, such as decompression and decryption, are considered. Without operation of the class action script 18 of the present invention, the SYSTEM V pkgadd utility is incapable of performing such special installation procedures due to the requirement to check the validation of all class source files, as provided by decision function 32 of FIG. 3. In accordance with the present embodiment, execution of class action script 18 provides special functions, such as decompression and decryption of the package prior to installation.

FIG. 4 is a flowchart showing the organize-all-files-in-a-class function 33 of FIG. 3; i.e., the operation of the present invention when the PKG_CAS_PASSRELATIVE keyword is not present, or set in an install class action script 18 of the present invention, as is indicated by no output 44 from FIG. 3's decision function 43.

The start of the FIG. 4 process is indicated by a numeral 50 that is common to FIGS. 3 and 4. Decision function 51 first operates to determine if there is another package file to be processed. If not, then no output 52 returns operation to decision function 37 of FIG. 3, as is indicated at 52. If a yes output 53 is provided, then decision function 54 is enabled to determine if the package file is in the class being processed.

A no output 55 from decision function 54 enables function 56 to select the next package file, whereupon operation returns to decision function 51, as is indicated at 517. A yes output 58 from decision function 54 enables function 59 to derive source and destination from FIG. 2's pkgmap 12, followed by enabling of function 60 to write the source and destination to the file list.

Once operation of function 60 has been completed, output 61 enables function 56 to select the next package file, and operation returns to decision function 51, as indicated at 57.

Figure 5:
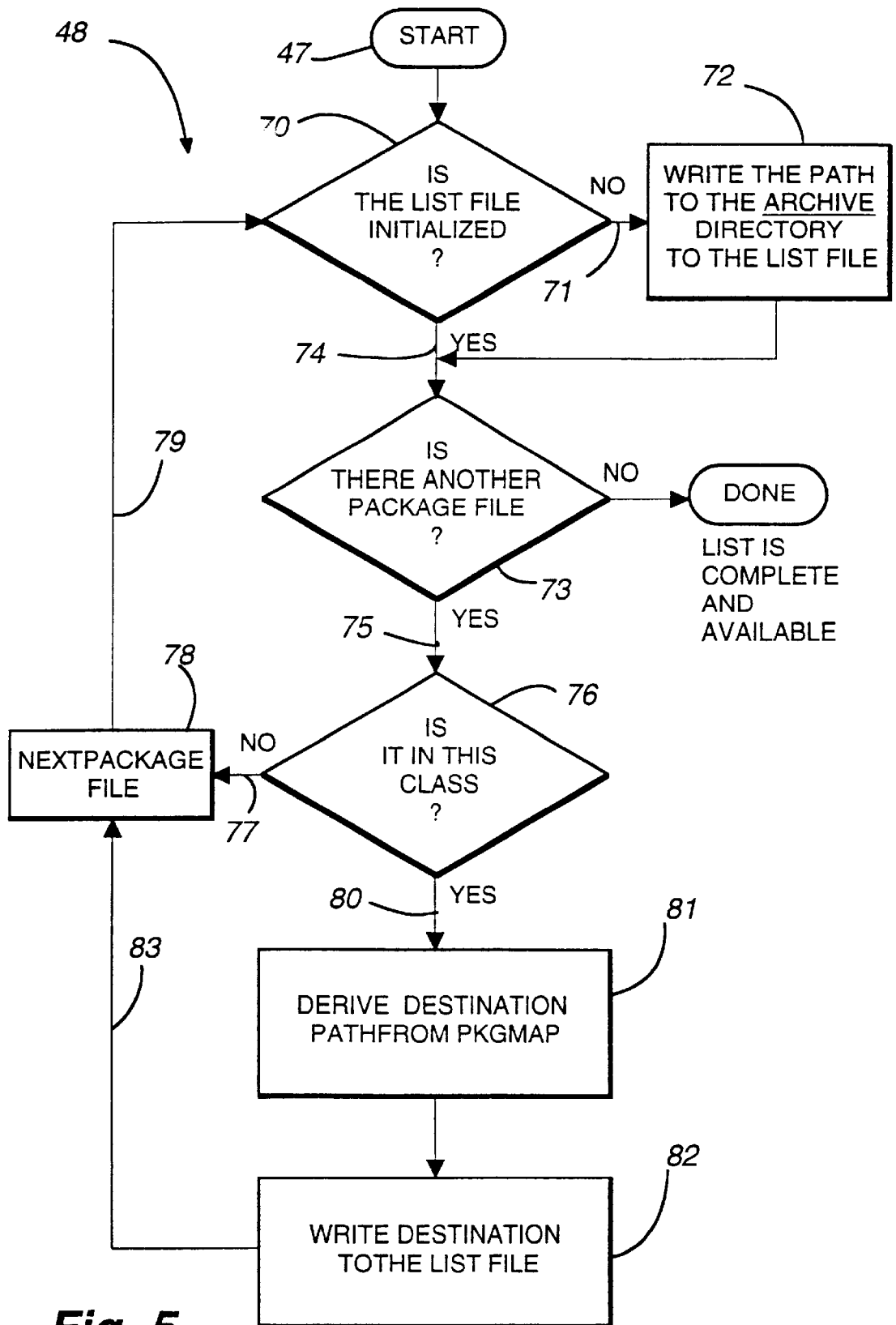
FIG. 5 is a flowchart showing the steps of a second embodiment of the "organize-all-files-in-a-class" operation 33 in FIG. 3; i.e. the operation of an embodiment of the present invention when the keyword PKG_CAS_CLASSRELATIVE is present or set in the install class action script of the present invention.

FIG. 5 is a flowchart showing the organize-all-files-in-a-class function 48 of FIG. 3; i.e., operation of the present invention when the keyword PKG_CAS_PASSRELATIVE is present or set in the install class action script 18 of FIG. 2, as is indicated by yes output 47 of FIG. 3's decision function 43.

The start of the FIG. 5 process is indicated at 47. As the first operation, decision function 70 determines if the list file is initialized. When no output 71 is present, function 72 is enabled to write the path to archive directory 17 of FIG. 2 to the list file, whereupon decision function 73 is enabled. Yes output 74 from decision function 70 directly enables decision function 73.

Decision function 73 determines is there is another package file to be processed. If not, then no output 74 returns operation to function 46 of FIG. 3. Yes output 75 from decision function 73 enables decision function 76 to determine if the package being processed is in the class being processed. If no, then output 77 enables function 78 to select the next package file, and the process of FIG. 5 returns to decision function 70, as indicated at 79.

Yes output 80 from decision function 76 enables function 81 to derive a destination path from FIG. 2's pkgmap 12, whereupon function 82 is enabled to write the destination to the list file.

Output 83 from function 82 then operates to cause function 83 to select the next package file, whereupon the FIG. 5 process returns to decision function 70.

A utility can be used to convert from the FIG. 1 UNIX SYSTEM V ABI format to the FIG. 2 UNIX SYSTEM V ABI format in accordance with the present invention. An example utility archives using the cpio utility, and compresses using the compress utility. This sample utility can also be used to construct a package that uses a different archival, and/or compression method than cpio and compress.

With reference to FIGS. 1 and 2, given a standard ABI style package 10 that contains several classes, including class1 and class2 which are to be archived, the following multi-step method represents the preferred operation of the utility to convert the standard ABI package into a class archive format of the present invention.

Step (1)—An alphabetic list of pkgmap 12 entries of ftype 'f' and 'v' which belong to class1 and class2, respectively, are established; i.e., two lists of ordinary files, one for class1 and one for class2.

Step (2)—Two archives are created and placed in archive directory 17 under names that can be mapped back to the class; in this case, the names 'class1' and 'class2'.

Step (3)—Delete all class1 and class2 files from reloc directory 13 and root directory 14.

Step (4)—Delete all empty directories from reloc directory 13 and root directory 14, including deletion of reloc directory 13 and root directory 14 themselves if everything is archived.

Step (5)—Modify pkginfo file 11, example entries being:
PGK_SRC_NOVERIFY=class1 class2
PKG_QKVERIFY=class1 class2
PGK_CAS_PASSRELATIVE=class1 class2

Step (6)—Add class action scripts 18 named i.class1 and i.class2 to install directory 15.

Step (7)—Modify pkgmap file 12 by correcting the recorded attributes of pkginfo 11 as they were modified in step 5, and add the correct compressed size to the first line of pkgmap 12.

As is apparent from the detailed description of this invention, operation of the present invention preserves the original System V functionality for a software package, while at the same time establishing an open interface definition for the delivery of compressed/encrypted packages. The specific details of the utility tools that are used to translate an ABI software package into a form that is defined by the class archive package of the present invention are not critical to the invention, and such utility tools may be those soon to be made generally available to the public from SUN MICROSYSTEMS.

An example of a utility that is used to archive a specific class in an ABI-style package, in order to convert that package to a class archive format package of the present invention, will now be described. The caller of the utility directs the utility to a custom archive script that is separate from the package that is responsible for creating a custom archive in the archive directory 17 of the package. That is, this utility operates to convert packages to/from class archive format.

The above mentioned custom archive script (arch_script) is written by the package producer as a part of the package design. It is preferably called with the following arguments.

$1="archive" if the "-u" option was not used, "dearchive" otherwise.

$2=archive directory 17 in the package.

$3=class name $4=(archive only) file containing list of files to archive.

The following archive-script operates to archive or dearchive all files in the stated class using the standard UNIX utility cpio.

```
# $1 = "archive", $2 =archive directory, $3 =
class name, $4 # = list of files in class
Archive=${2}/${3}
if [ $1 = "archive" ]; then
    cpio -oc -O $archive < $4
    chmod 0644 $Archive
    exit O
fi
# $1 = "dearchive", $2 = archive directory $3 =
class name
# $4 = list of files in the class
if [ $1 = "dearchive" ]; then
    cpio -idukm -I $Archive
    if [ $? -eq O ]; then
        rm -r $Archive
        exit O
    else
        exit $?
    fi
fi
```

As is well known to those of skill in the art, the published requirements of UNIX System V ABI, and the SUN MICROSYSTEMS publication entitled "Application Packaging Developer's Guide", incorporated herein by reference, permit the procedure-scripts portion of scripts 16 to accomplish many different functions. Following is a list of the basis requirement for making a class archive package in accordance with this embodiment.

(1) Generally there must be only one class per archive file. That is, no archive may contain files from more than one class. However, two or more archives per class are permissible under special circumstances, as noted below at requirement (5).

(2) Class action script 18 that is associated with the archived class of directory 17 unpacks only those files from archive that are provided to class action script 18 through the standard input (stdin). An exception to this process is when the environment variable PKG_INIT_INSTALL is defined. In this latter case, the stdin file list can be ignored as long as everything in the archived class is unpacked and installed.

(3) Pkgmap 12 contains the correct size and checksum for all class action scripts 18 that are to be verified by pkgadd. Note that it is not required that pkgadd verify class action script 18 itself.

(4) Pkginfo 11 contains a PKG_SRC_NOVERIFY keyword entry for each class that is to be archived in archive directory 17.

(5) Due to the steps outlined in (2) above, it is generally not practical to include more than 500 entries in archive directory 17. This is one reason that requirement (1) above allows more than one class per archive file. In order to speed-up the selective extraction from a large set of archived files from archive directory 17, it is possible for a file class having 2,000 items to be split across four archives. In this case, each archive will hold some ordered subset of 500 entries. Class action script 18 now takes responsibility for selecting the correct archive, based upon the list of items to extract.

A reasonable approach for extracting relative paths is to write a class action script 18 in such a way that it will "cd" to the directory that is indicated by the environment variable ${BASEDIR}, and then unpack the archive.

If absolute pathnames are archived from the package's root directory 14, the leading "/" is stripped from the absolute path, and archive is performed as a relative path. Class action script 18 will now "cd" to the directory that is indicated by ${PKG_INSTALL_ROOT:-/} before unloading the archive. Thus, permitting installation to clients from a server.

The file list that is passed to class action script 18 is preferably used to extract only those specified files from archive. An absolute path list that is passed for extraction will be edited before passing it to the archival utility; i.e., the absolute path will be stripped of it's leading "/".

It is permissible to have two archives that represent the reloc 13 and root 14 components of a single class, as long as they can be identified by their class action script 18, and as long as both components can be unpacked by that single script 18, given a single list of absolute and relative pathnames.

Following is a sample class archive class action script 18 in accordance with this embodiment.

```
# This class action script is preferably executed within a
  Bourne shell # by pkgadd.
```

```
NAME="i.none"
FILELIST=${PKGSAV:?undefined}/filelist
BD=${BASEDIR:-/}
is_an_archive=0
is_a_filelist=0
list_empty=1
local_install=0
Spcl_init=0
Rm_alt_sav=0
Tmp_xpath=/usr/tmp$$dir
MV_path=/usr/sbin/static
MV_cmd_$MV_xpath/mv
CPIO_xpath=/usr/bin
CPIO_cmd=$CPIO_xpath/cpio
ZCAT_xpath=/usr/bin
ZCAT_cmd=$ZCAT_xpath/zcat
LN_xpath=/usr/bin
LN_cmd=$LN_xpath/ln
NAWK_xpath=/usr/bin
NAWK_cmd=$NAWK_xpath/nawk
RM_xpath=/usr/bin
RM_cmd=$RM_xpath/rm
eval_pkg( ) {
    # Get the package source directory.
    read path
```

-continued

```
    if [ ${path:-NULL} !=NULL ] : then
        PKGSRC=${path:?undefined}
        # Look for the archive (it may or may not be
                # compressed) .
        if [ -r $PKGSRC/archive/none.Z ] ; then
            -r $PKGSRC/archive/none.Z ] ; then
                is_an_archive
        fi
    else
        exit 0# empty pipe, we're done
    fi
}
# main part of script.
eval-pkg
if [ $is_an_archive -eq 0] ; then
    echo "ERROR : i.none cannot find archived files in
            $PKGSRC/archive."
    exit 1
fi
# This script works only with relocatable paths.
Reloc_Arch=$PKGSRC/archive/none
# Now find the save directory for our extension list.
if [ ! -d $PGKSRC ] : then
    echo "WARNING : i.none cannot find save directory
            $PKGSAV."
    PKGSAV=$tmp_xpath/$PKG.sav
    if [ ! -d $PKGSAV ] ; then
        /usr/bin/mkdir $PGKSAV
    fi
    if [ $? -eq 0] ; then
        echo "Using alternate save directory." $PKGSAV
        FILELIST-$PKGSAV/filelist
        Rm_alt_sav=1
    else
        echo "ERROR : cannot create alternate save
                directory." $PGKSAV
        exit 1
    fi
# If there is already an extraction list, delete it.
    if [ -f $FILELIST ] ; then
        rm $FILELIST
    fi
# GO to base directory.
    cd $BD
# If this isn't an actual install, construct the
    # extraction list.
    if { ${PKG_INIT_INSTALL: -null} = null ] ; then
        is_a_filelist=1
        whileread path
        do
                echo $path >> $FILELIST
                list_empty=0
        done
    fi
# Extract the archive.
    if [ $is-a-filelist -eq 1 ] ; then
        if [ $list_empty -eq 0 ] ; then
            $ZCAT_cmd $Reloc_arch
            $CPIO_cmd -idukm -E $FILELIST
            if [ $? -ne 0 ] ; then
                echo "cpio of $reloc_arch failed with error $?."
                exit 1
            fi
        else
            $ZCAT_cmd $Reloc_Arch
            $CPIO_cmd -idukm
        fi
        if [ -f $FILELIST ] : then
            $RM_cmd $FILELIST
        fi
```

```
-continued if [ $Rm_alt_sav -eq 1 ] ; then
    $RM_cmd -r $PKGSAV
fi
exit 0
```

The following is an example of the content of a class archive pkginfo file 11 that is written to test the functionality of class archive in accordance with the present embodiment.

PKG=TSTPclrc1
NAME=class archive package
ARCH=i386
VERSION=1.0
PRODNAME=SunOS
MAXINST=1000
CATEGORY=system
DESC=Sample package for testing class archive functionality
VENDOR=Test group
EMAIL=
CLASSES=none group spcldrv
PKG_SRC_NOVERIFY=none
PKG_DST_QKVERIFY=none
PKG_CAS_PASSRELATIVE=none
BASEDIR=/opt/clrcdemo The operating environment, in which the present invention is used, encompasses the general distributed computing system, wherein general purpose computers, workstations, or personal computers are connected via communication links of various types, in a client-server arrangement, wherein programs and data, many in the form of objects, are made available by various members of the system. Examples of general distributed computing systems include SPARC systems offered by Sun Microsystems, Inc., client-server systems configured from personal computers offered by IBM Corporation and by other manufacturers of IBM-compatible personal computers, and systems running the UNIX operating system.

Figure 6:
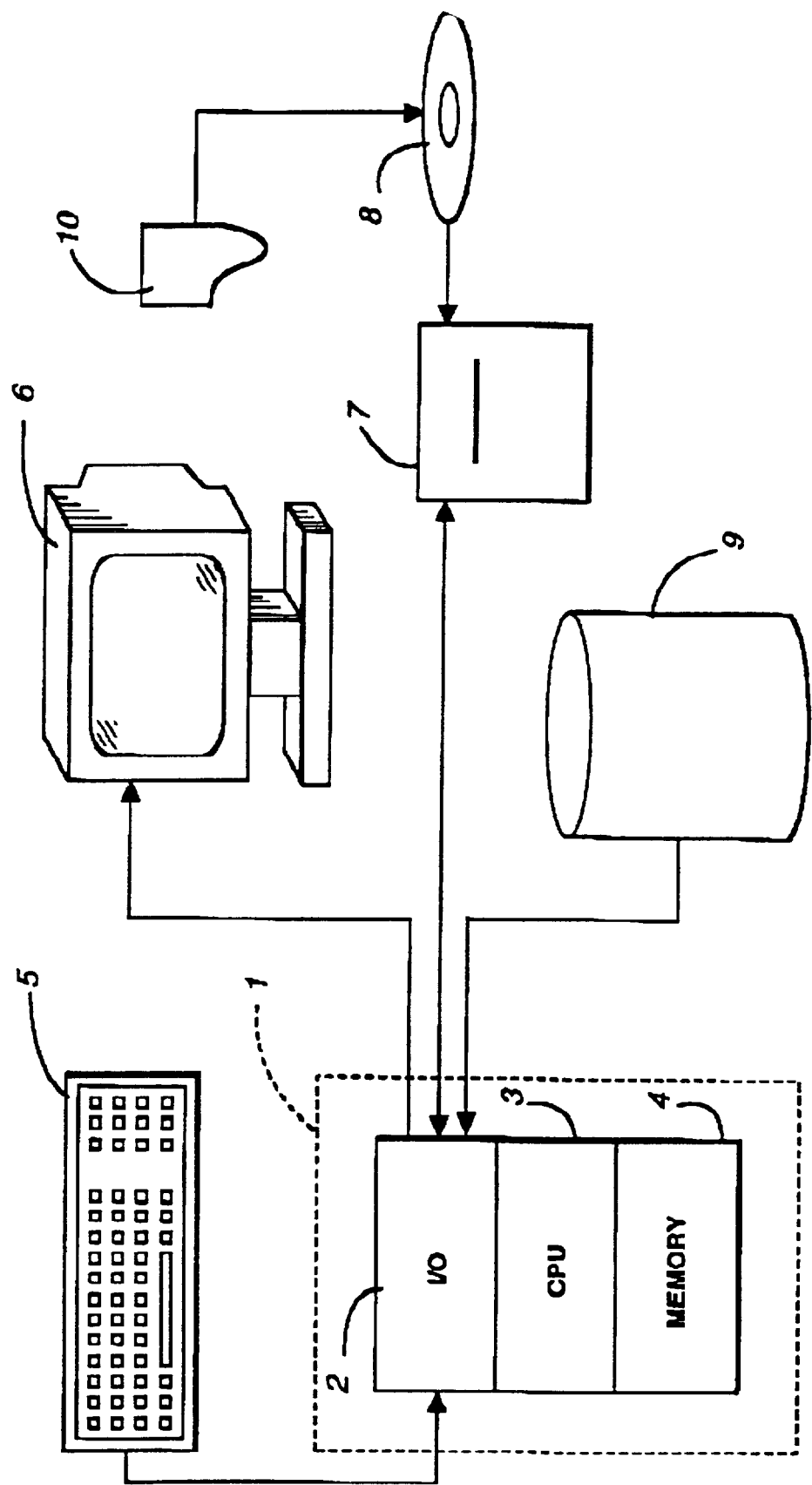
FIG. 6 shows an operative environment of this invention that comprises elements of a general purpose workstation computer.

Some of the elements of a general purpose workstation computer are shown in FIG. 6, wherein a processor 1 is shown, having an input/output (I/O) section 2, a Central Processing Unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system.

The invention has been described in detail while making reference to preferred embodiments thereof. It will be appreciated that those skilled in the art will, upon learning of this invention, readily visualize yet other embodiments that are within the spirit and scope of this invention. Thus, this detailed description is not be taken as a limitation on this invention.

What is claimed is:

1. A method for facilitating the installation of software onto a computer system having an operating system that performs a validation check on said software and aborts installation of said software when said validation check fails, the method comprising:

providing said software in the form of one or more special-feature classes that would cause said validation check to fail were said validation check to occur; and providing one or more scripts that relate to said special-feature classes and whose execution enables the installation of said special-feature classes onto said computer system in a manner that skips said validation check of said special-feature classes.

2. The method of claim 1 further comprising performing a validation check on said special-feature classes after installation thereof onto said computer system.

3. The method of claim 1 wherein the act of providing said software in the form of one or more special-feature classes includes at least one of encrypting and compressing said software.

4. The method of claim 3 further comprising performing a validation check on said special-feature classes after installation thereof onto said computer system.

5. A method of providing an extension to the UNIX System V ABI format, the method comprising:

providing software for installation on a UNIX computer system;

archiving said software so as to generate one or more special-feature classes that would fail a validation check by said UNIX computer system during installation if such validation check were to occur;

providing one or more scripts whose execution enables installation of said special-feature classes onto said UNIX computer system in a manner that skips said validation check of said special-feature classes; and organizing files in said special-feature classes into a list that enables said files to be installed onto said UNIX computer system by operation of said scripts.

6. The method of claim 5 further comprising identifying the presence of said special-feature classes by the use of a keyword PKG_SRC_NOVERIFY.

7. The method of claim 6 further comprising providing for the extraction of said special-feature classes by the use of a keyword PKG_CAS_PASSRELATIVE.

8. The method of claim 7 further comprising providing for a verification check of special-feature classes after installation by use of a keyword PKG_DST_QKVERIFY.

9. The method of claim 8 wherein said act of archiving said software includes at least one of encrypting and compressing said software.

10. A method of providing an extension to the UNIX System V ABI format, the method comprising:

providing an archive directory containing a software class having data that has been compressed and/or encrypted;

providing an install directory containing for said software class a corresponding install-class-action script that provides for the installation of said software class from said archive directory in a manner that skips a validation check of said software class during installation;

executing said install-class-action script;

providing a first keyword identifying the presence of said software class within said archive directory;

sensing the presence of said software class via said first keyword, and in response thereto organizing files of said software class into a first list comprised of an archive locator and a list of destinations, said first list enabling said software class to be installed from said archive directory by operation of said install-class-action script; and performing a validation check of said software class after installation.

11. A system extension to a computer operating system, the system extension comprising:
- a software package archive directory capable of containing one or more special-feature classes each containing one or more files, said special-feature classes having characteristics which would cause a validation check performed thereon to fail;
- an install directory containing one or more install-class-action scripts that relate to said special-feature classes and whose execution by said operating system enables installation of said special-feature classes from said archive directory in a manner that skips a validation check of said special-feature classes; and
- a mechanism configured to organize the files in said special-feature classes into a list that enables said files to be installed from said archive directory by operation of said related install-class-action scripts.

12. The system extension of claim 11 further comprising a mechanism configured to perform a validation check on said special-feature classes after said installation.

13. A method of preparing software for installation on a computer system having an operating system capable of performing a validation check on the software prior to installation, the method comprising:
- archiving the software into a special-feature class that would fail a validation check by the operating system were one to be performed thereon; and
- providing a script for installing the software by skipping a pre-installation validation check of the special-feature class and extracting the software from the special-feature class onto the computer system.

14. The method of claim 13, wherein the act of archiving the software into a special-feature class includes at least one of encrypting and compressing the software into a special-feature class.

15. The method of claim 13, wherein the act of archiving the software into a special-feature class that would fail a validation check by the operating system includes archiving the software into a special-feature class that would fail a checksum test by the operating system.

16. The method of claim 13, wherein the software includes a plurality of files, wherein the act of archiving the software into a special-feature class includes archiving the plurality of files into a single file, and wherein the act of providing a script includes providing a script for extracting the plurality of files from the single file onto the computer system.

17. The method of claim 13, wherein the act of providing a script further includes providing a script for performing a validation check on the software after extracting the software onto the computer system.

18. A method for installing software onto a computer system having an operating system capable of performing a validation check on the software prior to installation, the method comprising:
- providing the software in the form of a special-feature class that would fail a validation check by the operating system were one to be performed thereon;
- skipping a pre-installation validation check of the special-feature class; and
- extracting the software from the special-feature class onto the computer system.

19. The method of claim 18, further comprising generating the special-feature class by at least one of encrypting and compressing the software into the special-feature class.

20. A computer-readable medium having computer code embodied therein comprising:
- a special-feature class archived from software that is to be installed on a computer system having an operating system capable of performing a validation check on the software prior to installation, the special-feature class being of the type that would fail a validation check by the operating system were one to be performed thereon; and
- a script for installing the software by skipping a pre-installation validation check of the special-feature class and extracting the software from the special-feature class onto the computer system.

21. The computer-readable medium of claim 20 wherein the special-feature class includes at least one of encrypted and compressed data.

22. The computer-readable medium of claim 20 wherein the computer-readable medium comprises a computer-readable storage medium.

23. The computer-readable medium of claim 20 wherein the computer-readable medium comprises a data signal.

24. The computer-readable medium of claim 20 wherein the script includes Bourne shell commands.

* * * * *